Jan. 28, 1964  A. CAFULLI ETAL  3,119,190
APPARATUS SIMULATING THE TRAVEL OF A VEHICLE ON A ROAD
Filed Aug. 8, 1961  2 Sheets-Sheet 1

INVENTORS
ANNAMARIA CAFULLI
EZIO MORIONDO

*Kenyon & Kenyon*
ATTORNEYS

Jan. 28, 1964  A. CAFULLI ETAL  3,119,190
APPARATUS SIMULATING THE TRAVEL OF A VEHICLE ON A ROAD
Filed Aug. 8, 1961  2 Sheets-Sheet 2

INVENTORS
ANNAMARIA CAFULLI
EZIO MORIONDO

Kenyon & Kenyon
ATTORNEYS ness or lack of promptness of his mental reactions, automatically stopping the motion of the moving strip;

Auxiliary devices to complete the reading and recording of the driver's mental and physical reactions in the unexpected situations in which he may come to find himself.

The accompanying drawings present a preferred, non-restrictive form of embodiment of the apparatus embodying the invention, constructed for educational and recreational purposes.

Figure 1:
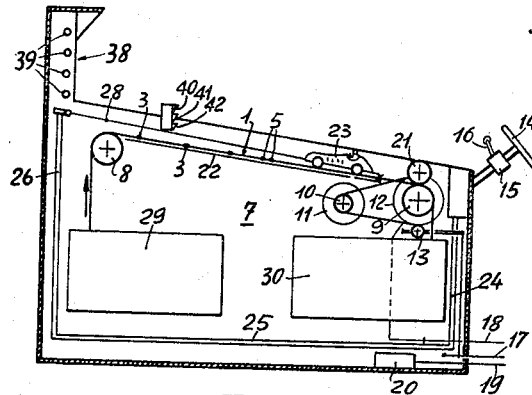
FIG. 1 is a diagrammatical longitudinal section of the apparatus with discontinuous moving strip.
Figure 2:
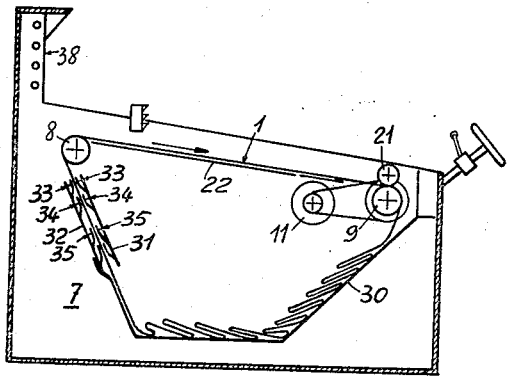
FIG. 2 is a diagrammatical longitudinal section of the apparatus with endless moving strip.

In reference to FIGS. 1 and 2, the apparatus comprises a strip 1 of flexible, inextensible material of constant width, which carries, impressed upon it or inserted in it, a drawing of a road, reproducing on a suitably reduced scale straight stretches of road, curves, squares, crossroads, junctions, railway crossings, etc. In addition, traffic signs and milestones are reproduced on the strip in suitable locations.

The road may be of a color different from that of the strip to make its outline more readily evident.

Metal contacts 3 are located along the edge of the road protruding from the upper and lower sides of the strip and at distances which will be provided for further on.

The contacts 4 are mounted, for example, on one margin of the strip and contacts 5 and 6 are on the opposite margin.

Contacts 4 are located at the positions of the milestone; contacts 5 are located, in pairs, at the points where traffic signs indicate that the vehicles should slow down; contacts 6 are located in pairs at the points where the vehicle is required to stop.

The distance between the two contacts of the pair 5 must always be the same; the same applies to contacts 6.

The distance between contacts 5 must, however, be different from the distance between contacts 6.

The strip may be made as long as desired and open, or it may be of limited length and in the form of an endless belt (FIG. 2).

The length of the endless belt may be as long as 40 or even 50 meters, while that of the open strip may be considerably greater. The construction of the apparatus is as follows: a box-shaped cabinet 7 (FIGS. 1 and 2) carries rollers 8 and 9 mounted on suitable bearings. Roller 8, which is idle or free turning, is preferably located at a height somewhat greater than that of roller 9 which is driven through any type of transmission and speed reducer unit, for example, by V-belts and pulleys, by an electric motor 11.

A friction clutch 12 of any type may be provided between the motor and its pulley and on any of the pulleys in the transmission a brake 13 may be provided.

The driver's position is at the end of the cabinet near which drive roller 9 is located. Above, on the upper portion of the driver's end of the cabinet there is a steering wheel 14 with steering column on which is mounted a selector switch 15 (see also FIG. 6) actuated by a lever 16 similar to the gear shift lever of an automobile.

On the lower end of the driver's end of the cabinet there are three pedals: pedal 17 which operates the brake 13, pedal 18 which operates the clutch 12 and pedal 19, the accelerator, which operates a variable resistor 20.

Pressing pedal 19, the variable resistance 20 decreases gradually.

Strip 1 is supported by rollers 8 and 9. Roller 9, in turning, causes the strip to move in the direction shown by the arrow, that is, from roller 8 toward roller 9.

Roller 9 may be of rubber to insure that the strip will adhere to the roller and a roller 21 may also be provided, its weight resting vertically above roller 9 on the strip. Roller 21 must also be properly guided so it will be free to shift in a vertical direction only.

To keep the strip from sagging downwards between the two rollers 8 and 9, a supporting surface is provided between them, as shown in 22. On the strip, near roller 9 is located the model 23 of an automobile, provided with a device for steering the front wheels, which face towards roller 8.

The model is steered by the turning of the steering wheel 14, which, through shafts, levers and pulleys or the like 24, 25 and 26, acts on a rocker arm 27 at the end of which are attached metal wires 28 connected to the stub axles of the front wheels of the model 23.

Figure 4:
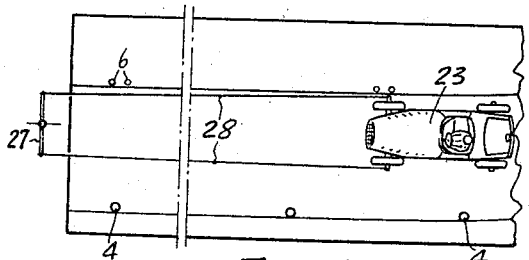
FIG. 4 is a diagrammatical plan view of the control devices for the model representing the vehicle.

The wires 28 (FIG. 4), in addition to transmitting the steering to the model, also hold the model in the desired position in respect to the cabinet in a longitudinal direction.

The strip is picked up from a container 29 (FIG. 1) and is deposited in another recipient 30 if of the open or discontinuous type of strip. If, instead, the strip is of the continuous or endless type (FIG. 2), it is deposited after leaving roller 9 on the bottom of the cabinet, following a natural procedure of folding loosely into layers which overlap one another, aided by slide 30. Before arriving again at roller 8, the strip passes between two plates 31 and 32 of insulating material, there being sets of brush contacts 33, 34 and 35 (FIGS. 2 and 6) mounted on the inside facing surfaces of the two plates 31 and 32. The brush contacts are so arranged that they are opposite each other in pairs along the margins of the strip. In this way the strip serves as an insulation between the opposing sets of contacts, while contacts 4, 5 and 6 mounted on the strip cause the circuits connected to brushes 33, 34 and 35 to close (see also FIG. 6).

The brush contacts are connected up among one another as will be specified further on. Contacts 34 are four in all, consisting of two equidistantly spaced pairs; their distance apart is the same as that of contacts 6 on the strip. The brush contacts 35 are six in all, consisting of three pairs of contacts located at distances apart equal to the distance between the contacts 5 on the strip. A brush contact 36 is also mounted underneath the model 23; another brush contact 37 is mounted on the supporting surface 22, in such a way that it comes in contact with contact 36 of model 23. Brush contact 37 extends over such a width as will cover the entire part of the strip which contains the road, whatever the point at which the strip comes to find itself during its travel. A panel 38 may be located at the opposite end of the cabinet from the driver's position to indicate the distance travelled.

The panel 38 may be constructed in any of various ways: for example, it may consist of a sheet of plate glass, covered with opaque material, except in limited areas left transparent and in which numerals are drawn, corresponding to those on the milestones reproduced on the strip 1.

Contacts 4 on the strip and the sets of brush contacts 33 must be equal in number to the transparent areas on the plate glass, behind each of which is located a lamp 39. At a position above the strip, for example, on the inside of the cabinet at one side, a model of a traffic light, with regular green 40, yellow 41 and red 42 lights, may be mounted.

Other lamps 43, 44 and 45 can be located in a readily visible position from the driver's position, to indicate specific conditions of the electrical circuit.

Figure 6:
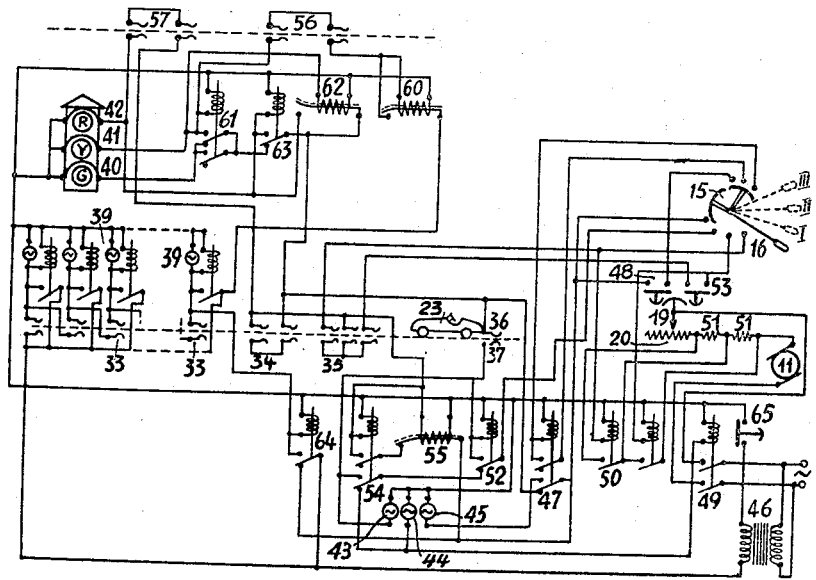
FIG. 6 is the general electrical schematic diagram of the apparatus.

FIG. 6 shows a schematic diagram of one of the possible electrical circuits capable of providing the desired operation of the apparatus. For the sake of clarity, the circuit will be described simultaneously with the description of the operation of the apparatus. Gear shift lever 16 (FIGS. 1 and 6) has a neutral position and, in the embodiment herein described, has three other positions corresponding to three gear shift positions.

A transformer 46 steps down the supply voltage to provide safe, low-voltage operation.

When lever 16 is in the neutral position, selector switch 15 energizes relay 47 through switch 48, which closes when accelerator pedal 19 is released and stays closed as long as said pedal is pressed down up to as far as half way.

Relay 47 is also self-excited through one of its moving contacts. The other moving contact, instead, cuts off the supply of current to brush contacts 36 of the model and 37 of the supporting surface 22. The electric motor 11 will then be out of the circuit.

When gear shift lever 16 is put in low gear, relay 49 is actuated, starting up electric motor 11.

Simultaneously, relay 47 will no longer be externally excited, but remains self-excited through switch 48. When the accelerator is pressed down more than half way, switch 48 opens the circuit and relay 47 is de-energized; one of its moving contacts thus places brush contacts 36 and 37 in the circuit. Shifting gear shift lever 16 to the second gear position, relay 50 is excited, short circuiting one of the fixed resistors 51 placed in series with the variable resistor actuated by accelerator 19.

In this way, by pressing the accelerator, the strip will now be able to travel at a greater speed than that attainable in low gear.

Shifting the lever 16 to high gear, the other fixed resistor 51 is shorted out, thus making it possible to attain a higher speed of the strip than can be reached in second gear. In order that the apparatus may operate properly, the driver must properly operate the driving controls, specifically, he must avoid allowing the model 23 to go off the road, he must obey the traffic signs and signals and must slow down or stop when required to do so.

In fact, if the driver fails to drive properly, the devices which stop the moving strip come into play. The driving errors can be any of the following: the model goes off the road; the driver fails to slow down; the driver fails to stop. When the model leaves the road contacts 3 close, causing the circuit which energizes relay 52 to be supplied with current by way of brushes 36 and 37, the moving contact of relay 52 thus cutting off current to relay 49 and cutting electric motor 11 out of the circuit, stopping it.

To put the model back on the road, one must release the accelerator 19, set gear shift lever 16 in neutral and then in low gear.

By accelerating lightly the model will be able to return onto the road, even if one of the contacts 3 happens to pass between brush contacts 36 and 37, because relay 47 opens the brush circuit. Once the model has returned onto the road the accelerator can be pressed down all the way and one can shift to second and high gear. When a road sign appears which requires that the driver slow down, the speed of the strip must be reduced by shifting into a lower gear than high.

If the lever is shifted into low gear the accelerator may be pressed down all the way; if, instead, one shifts down to second, the accelerator must be pressed down to about halfway to keep switch 53 from closing, which would connect up the set of brushes 33 fixed to plates 31 and 32 (FIG. 2).

The contacts 5 mounted on the strip close the circuit which excites relay 54 and thermal switch 55 when the accelerator is pressed down all the way while gear shift lever 16 is in second gear, or when the lever 16 is in high gear, whatever the position of the accelerator.

One of the mobile contacts of relay 54 opens the circuit supplying relay 49 which causes the motor to stop.

Relay 54 is self-excited through thermal switch 55, which, after a few seconds, cuts off the supply to relay 54 allowing the electric motor to be started up again once the accelerator has been released and the gear shift lever has been thrown into neutral, after which one can shift through the various gears again.

When coming up to a stop sign or stop signal, one must let off the accelerator 19, place the gear shift lever in neutral and then lightly press on the accelerator until the area in which the vehicle has been called upon to stop has been passed through. If this maneuver is not carried out, the contacts 6 on the strip close the circuit supplying the brush contacts 34 of plate 31 and 32 (FIG. 2), causing relay 54 to be excited again as in the case of failure to slow down.

One must still wait until thermal time delay relay 55 opens again, release the accelerator pedal 19, put the gear shift lever 16 in neutral and then go through the various gear positions again. If the traffic light 69 is installed four other sets of brush contacts 56 and 57 must be installed in plates 31 and 32.

Figure 3:
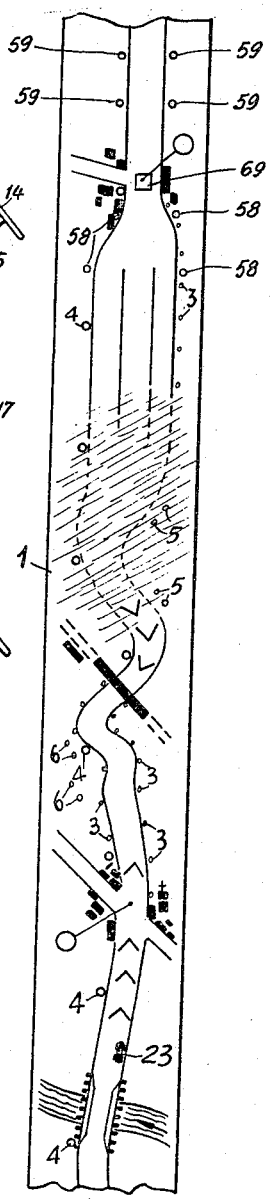
FIG. 3 is a plan view of a portion of the moving strip.

Naturally, two sets of contacts 58 and 59 (see FIG. 3) must also be mounted on the strip at distances from one another equal to those between brush contacts 56 and 57 (FIG. 6) and different from the distances between contacts 5 and contacts 6 (FIG. 3).

An interruptor 60 supplies one of the brushes 56 at intervals. When contacts 58 of the strip pass between the brush contacts 56, nothing will happen if switch 60 is open; if, instead, switch 60 is closed, relay 61 will be excited, which, in its rest position, keeps the traffic light's green light 40 lit. When relay 61 is excited, the green and yellow lights 40 and 41 of the traffic light light up simultaneously and thermal time delay relay 62 is excited, which, after a few seconds, excites relay 63, which interrupts the self-excitation of relay 61, putting out the green and yellow lights 40 and 41 and lighting up the red light 42. Relays 62 and 63 are self-excited through relay 47. When the red light lights up, brush contacts 57 are also made hot so that if the driver fails to stop, contacts 59 of the strip close the excitation circuit of relay 54 stopping the electric motor.

To start up the strip again, one must go through the same motions as in the cases of failure to slow down or failure to stop. Lamps 39 on panel 38 light up when the contacts 4 of the strip pass between the brushes 33 of plates 31 and 32.

The closing of each brush circuit causes a self-excited relay to become excited, which remains so, along with a corresponding lamp which lights up. When the last lamp lights up, this causes relay 64 to close, interrupting the supply to the entire circuit and causing the strip to stop its motion.

Lamps 39 remain lit until manual switch 65 is operated, which, cutting off the source of supply, brings the circuit back to the positions shown at the beginning of the description.

To ensure that lights 39 light up in succession, the last set of brush contacts 33, that is, the set which last touches contacts 4 on the strip, lights up the first of lights 39 and, simultaneously, by way of autoexcitation of the relay provided, it sends current to the immediately preceding contact 33, so that the following contact 4 will close the circuit and cause the second light 39 to light up and send current to the brush 33 for the third light, and so on.

The embodiment of the apparatus suitable for checking the physical and mental reactions of the driver may include all of the preceding details described herein, or may be reduced, doing away with spectacular details, such, for example, as the panel 38 showing the mileage travelled and the automatic stopping of the moving strip.

On the other hand, test instruments and recording devices are installed to show driving errors, as well as devices for producing special conditions and to detect and record the driver's mental reactions.

For example, an elastic device mounted on the steering wheel column may be connected up to a detection and recording device to register any trembling of the driver's hands or arms. A set of headlights may be located in the vicinity of the road to check the driver's sight when subjected to glare and afterwards.

By arranging for the headlights to light up near a curve in the road, one can readily determine whether the driver has effectively been blinded by the glare and how long the condition continues after the headlights have gone out. Traffic signs can be made to light up suddenly using light bulbs and indicating devices can be installed to check the promptness of the driver's perception and the speed of his reaction.

Figure 5:
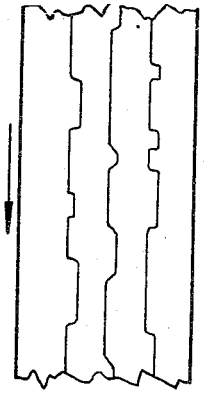
FIG. 5 is a portion of a strip on which the driving behavior, showing the mental-physical reactions of the driver, is recorded, giving a permanent record.

In fact, a recording tape, running at a speed of 100 mm. per second, for example, and equipped with a writing pen actuated by electromagnets excited by the headlight control or by the luminous traffic signs and other writing pens, actuated by electromagnets connected in the gear shifting circuits, the accelerator and steering device circuits, can indicate the time passing between the appearance of the sign or signal and the driver's reaction; this time can readily be evaluated in hundredths of a second because each millimeter of tape between the marks drawn by the writing points represents a hundredth of a second (see FIG. 5 in this respect). For example, the road may be divided into two separate lanes with a sudden signal instructing which lane to take and the writing recorder can be used to check the promptness of the response and the perception of the signal.

It will be appreciated that the form of the invention described above is illustrative only and that it may be carried out in other ways nad other equipment without departing from the spirit or essential attributes thereof. It is desired and indicated that the embodiment described above be considered merely as illustrative and not restrictive, reference being had to the appended claims rather than the foregoing description to indicate the scope of the invention.

We claim:

1. An apparatus simulating the travel of a vehicle on a road comprising:
   a flexible longitudinally movable strip representing a road,
   motor means for driving said strip longitudinally,
   braking means for halting the motion of said strip,
   a model vehicle on said strip, said vehicle being movable in a direction transverse to the length of said strip, said vehicle being held substantially fixed in the direction of travel of said strip, whereby the relative motion between said strip and said vehicle in the direction of said strip is due to the movement of said strip,
   a steering wheel spaced from said vehicle,
   steering means linking said steering wheel to said vehicle whereby the transverse position of said vehicle on said strip is determined by the angular position of said steering wheel,
   electrical contacts on the under side of said vehicle, and electrical contacts on said strip,
   control means for actuating said braking means when said electrical contacts on said vehicle contact selected ones of said electrical contacts on said strip, whereby an operator's manipulation of said steering wheel will determine the frequency of contact between said electrical contacts on said vehicle and said electrical contacts on said strip.

2. An apparatus simulating the travel of a vehicle on a road comprising:
   a flexible longitudinally movable strip,
   two rollers spaced apart and supporting a portion of said strip,
   motor means for driving said strip longitudinally around said rollers,
   braking means for halting the motion of said strip, a model vehicle on said strip, said vehicle being movable in a direction transverse to the length of said strip, said vehicle being held substantially fixed in the direction of travel of said strip, whereby the relative motion between said strip and said vehicle in the direction of said strip is due to the movement of said strip, a steering wheel spaced from said vehicle, steering means linking said steering wheel to said vehicle whereby the transverse position of said vehicle on said strip is determined by the angular position of said steering wheel, electrical contacts on the under side of said vehicle, and electrical contacts on said strip, control means for actuating said braking means when said electrical contacts on said vehicle contact selected ones of said electrical contacts on said strip, whereby an operator's manipulation of said steering wheel will determine the frequency of contact between said electrical contacts on said vehicle and said electrical contacts on said strip.

3. An apparatus simulating the travel of a vehicle on a road comprising:

a flexible movable strip forming a continuous loop, a feed roller and a return roller, said rollers being spaced apart to support a portion of said strip, said roller being spaced apart by a distance substantially less than half the entire length of said strip, motor means for driving said strip from said feed roller to said return roller, a container under said rollers for holding the unsupported portion of said strip, an inclined side portion of said container located under said return roller to cause said strip to be deposited in overlapping folds in said container when said strip is being driven, braking means for halting the motion of said strip, a model vehicle on said strip, said vehicle being movable in a direction transverse to the length of said strip, said vehicle being held substantially fixed in the direction of travel of said strip, whereby the relative motion between said strip and said vehicle in the direction of said strip is due to the movement of said strip, a steering wheel spaced from said vehicle, steering means linking said steering wheel to said vehicle whereby the transverse position of said vehicle on said strip is determined by the angular position of said steering wheel, electrical contacts on the under side of said vehicle, and electrical contacts on said strip, control means for actuating said braking means when said electrical contacts on said vehicle contact selected ones of said electrical contacts on said strip, whereby an operator's manipulation of said steering wheel will determine the frequency of contact between said electrical contacts on said vehicle and said electrical contacts on said strip.

References Cited in the file of this patent

UNITED STATES PATENTS

| | | |
|---|---|---|
| 2,088,264 | Heinis | July 27, 1937 |
| 2,269,444 | Durham et al. | Jan. 13, 1942 |
| 2,273,091 | De Silva | Feb. 17, 1942 |
| 2,341,312 | Chedister | Feb. 8, 1944 |
| 2,742,714 | Allgaier | Apr. 24, 1956 |
| 2,908,087 | Weinreich et al. | Oct. 13, 1959 |

FOREIGN PATENTS

| | | |
|---|---|---|
| 536,745 | France | Feb. 17, 1922 |